United States Patent [19]
Adachi et al.

[11] Patent Number: 5,238,229
[45] Date of Patent: Aug. 24, 1993

[54] BURNER FOR GENERATING SOOT AND FURNACE TO DEPOSIT SOOT BY USING THE SAME

[75] Inventors: Takakatsu Adachi, Shinnanyo; Hitoshi Matsumura, Tokuyama; Tetsuo Akiyama, Nishinomiya, all of Japan

[73] Assignees: Nisshin Steel Co., Ltd., Tokyo; Chugai Ro Co., Ltd., Osaka, both of Japan

[21] Appl. No.: 858,955

[22] Filed: Mar. 27, 1992

[30] Foreign Application Priority Data

Mar. 28, 1991 [JP] Japan .................................. 3-064542

[51] Int. Cl.⁵ ............................................. C21D 9/56
[52] U.S. Cl. ..................................... 266/103; 432/149
[58] Field of Search ............... 266/103, 102; 432/149, 432/148

[56] References Cited

FOREIGN PATENT DOCUMENTS

| | | |
|---|---|---|
| 3913004 | 10/1990 | Fed. Rep. of Germany . |
| 51-112413 | 4/1976 | Japan . |
| 7027606 | 7/1977 | Japan .................. 266/103 |
| 60-56213 | 12/1985 | Japan . |
| 3114924 | 5/1988 | Japan .................. 266/103 |
| 3-188223 | 8/1991 | Japan . |
| 3-87022 | 9/1991 | Japan . |
| 1088089 | 10/1967 | United Kingdom . |

OTHER PUBLICATIONS

Patent Abstracts of Japan, vol. 14, No. 300 (M-991) 28 Jun. 1990 & JP-A-02 097 812 (Chugai) *abstract*.
Patent Abstracts of Japan, vol. 10, No. 203 (C-360) 16 Jul. 1986 & JP-A-61 044 728 (Hitachi) *abstract*.
Patent Abstracts of Japan, vol. 4, No. 190 (C-37) 26 Dec. 1980 & JP-A-55 128 529 (Nippon Steel) *abstract*.
Patent Abstracts of Japan, vol. 14, No. 304 (C-734) 29 Jun. 1990 & JP-A-02 101 123 (Chugai) *abstract*.

*Primary Examiner*—Scott Kastler
*Attorney, Agent, or Firm*—Wenderoth, Lind & Ponack

[57] ABSTRACT

Prior to annealing of cold rolled stainless steel strip, soot is deposited on the surface of the stainless steel strip by a soot generating burner, and thereby the heat absorption efficiency of the stainless steel strip in the annealing furnace is increased to enhance the heat treatment capability in the annealing furnace. This soot generating burner forms a flame by injecting a premixed gas at low air ratio of fuel gas and pure oxygen or high oxygen enriched air from the nozzle opening, and an air injection port for injecting air for guiding the flame is formed on the outer circumference of the nozzle opening. By this guide air, the flame is guided to form, so to speak, an air curtain, and it is therefore possible to direct the flame efficiently to the surface of the stainless steel strip, thereby preventing the soot from depositing near the nozzle opening.

20 Claims, 6 Drawing Sheets

BURNER FOR GENERATING SOOT AND FURNACE TO DEPOSIT SOOT BY USING THE SAME

BACKGROUND OF THE INVENTION

1. Field of the Invention

The present invention relates to a burner for generating soot, and a furnace to deposit soot on the surface of metal strip such as stainless steel strip using the same burner for generating soot.

2. Description of the Related Art

In a manufacturing process of cold rolled stainless steel strip, a continuous annealing furnace is incorporated, and the stainless steel strip after cold rolling is heated and annealed mainly by, for example, radiation heat. In such continuous annealing furnace, the stainless steel strip reflects the heat rays owing to its excellent surface gloss, and the absorption efficiency of radiation heat is low, and it takes time to raise temperature, and the heat treatment capability of the annealing furnace is poor.

Accordingly, to enhance the heat treatment capability of stainless steel strip, it is attempted, for example in the Japanese Examined Patent Publication (KOKOKU) No. JP-B2 60-56213 (1985), to deposit soot on the surface of the stainless steel strip to be annealed by using soot generating burner, and heat quickly by raising the heat absorption rate of the stainless steel strip.

A conventional soot generating burner is disclosed, for example, in the Japanese Unexamined Patent Publication (KOKAI) No. JP-A 2-97812 (1990). In this prior art, soot is generated by burning the fuel gas at an air ratio of 0.3 or less. When soot is generated at such low air ratio, soot also deposits on the tip of the burner, and the soot deposit may clog the nozzle opening, or the soot deposits gradually to build up into a lump, and the soft lump of soot is carbonized by flame and solidified into a coke form, so that a stable flame may not be formed. For example, when forming a downward flame by a conventional soot generating burner, since the specific gravity of the flame is small, the flame contacts with the burner tiles and is cooled, and the generated soot often builds up on the nozzle opening, and the soot grows up like an icicle, and the soft lump of soot is carbonized and solidified as mentioned above, and deposits near the nozzle opening. Furthermore, the soot gradually building up at the nozzle tip drops onto the steel strip and is burnt imperfectly in the annealing furnace, and may be stagnant in the subsequent cooling zone or pickling bath, thereby contaminating the apparatus. Or, if the soot generating burner is installed to form an upward flame, the soot builds upward to the periphery of the nozzle tip, and same problems are caused.

SUMMARY OF THE INVENTION

It is hence a primary object of the invention to present a burner for generating soot for forming a stable flame to deposit soot on the surface of stainless steel strip or the like passed continuously, without allowing the soot to build up on the burner tip or burner tiles if combustion gas is burnt at a low air ratio, and a furnace to deposit soot using the same.

To achieve the above object, the invention presents a burner for generating soot characterized by forming an air injection port on the outer circumference of a nozzle opening for injecting a premixed gas of fuel gas and pure oxygen or high oxygen enriched air (hereinafter both gases are merely referred to as pure oxygen) at a smaller flow rate than necessary for completely burning the fuel gas, and guiding the flame by injecting a guide air from this air injection port.

The invention also presents a furnace to deposit soot by installing a burner for generating soot toward the surface of a metal strip to be annealed, in a furnace for depositing soot installed at the upstream side of an annealing furnace, wherein the burner for generating soot is characterized by forming an air injection port on the outer circumference of a nozzle opening for injecting a premixed gas of fuel gas and pure oxygen or high oxygen enriched air at a smaller flow rate than necessary for completely burning the fuel gas, and guiding the flame by injecting a guide air from this air injection port.

According to the invention, the premixed gas of fuel gas and pure oxygen is injected from the nozzle opening, and the air injection port is formed on the outer circumference of this nozzle opening, and a guide air is injected from this air injection port to guide the flame. Therefore, so to speak, an air curtain is formed outside the flame, and when this soot generating burner is installed so as to form the flame downward, the flame is prevented from going up by buoyancy, and the flame is prevented from convecting by guiding as if enveloping the flame from outside, so that the flame may be directed efficiently to the surface of metal strip, for example, stainless steel strip. It is hence possible to deposit and form the soot stably on the metal strip surface. At this time, since the flame is guided by the air curtain as mentioned above, the flame is prevented from contacting with the burner tiles to be cooled, allowing the soot to deposit and build up near the nozzle opening, so that a stable flame may be formed continuously for a long period.

Moreover, according to the invention, by such soot generating burner, by depositing soot on the surface of metal strip such as stainless steel strip and then leading into the annealing furnace, the heat absorption efficiency of the stainless steel strip in the annealing furnace is improved, and the heat treatment capability of the annealing furnace is enhanced. The invention may be similarly applied to the soot generating burner installed so as to generate the flame either upward or sideways.

Thus, in the invention, since the premixed gas of fuel gas and pure oxygen or high oxygen enriched air is injected from the nozzle opening, an air injection port for injecting a guide air is formed on the outer circumference of this nozzle port, and the flame is guided so as to envelope from the outside by the air from this air injection port, if the soot generating burner is installed so that the flame is formed downward, the flame is prevented from moving up by buoyancy, and the flame is also prevented from convecting, so that the flame may be efficiently directed to the surface of metal strip such as stainless steel strip, or even if the soot generating burner is installed so as to generate the flame either upward or sideways, the flame may be formed toward the metal strip surface. In this way, the soot is prevented from depositing on the burner tip such as nozzle opening, and a stable flame is formed, so that the soot may be stably deposited on the surface of a metal strip such as stainless steel strip. Furthermore, in the invention, the stainless steel strip on which soot is thus stably deposited is then supplied into the annealing furnace, and therefore heat absorption efficiency of the stainless steel strip is improved, so that the heat treatment capability of the annealing furnace may be enhanced.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
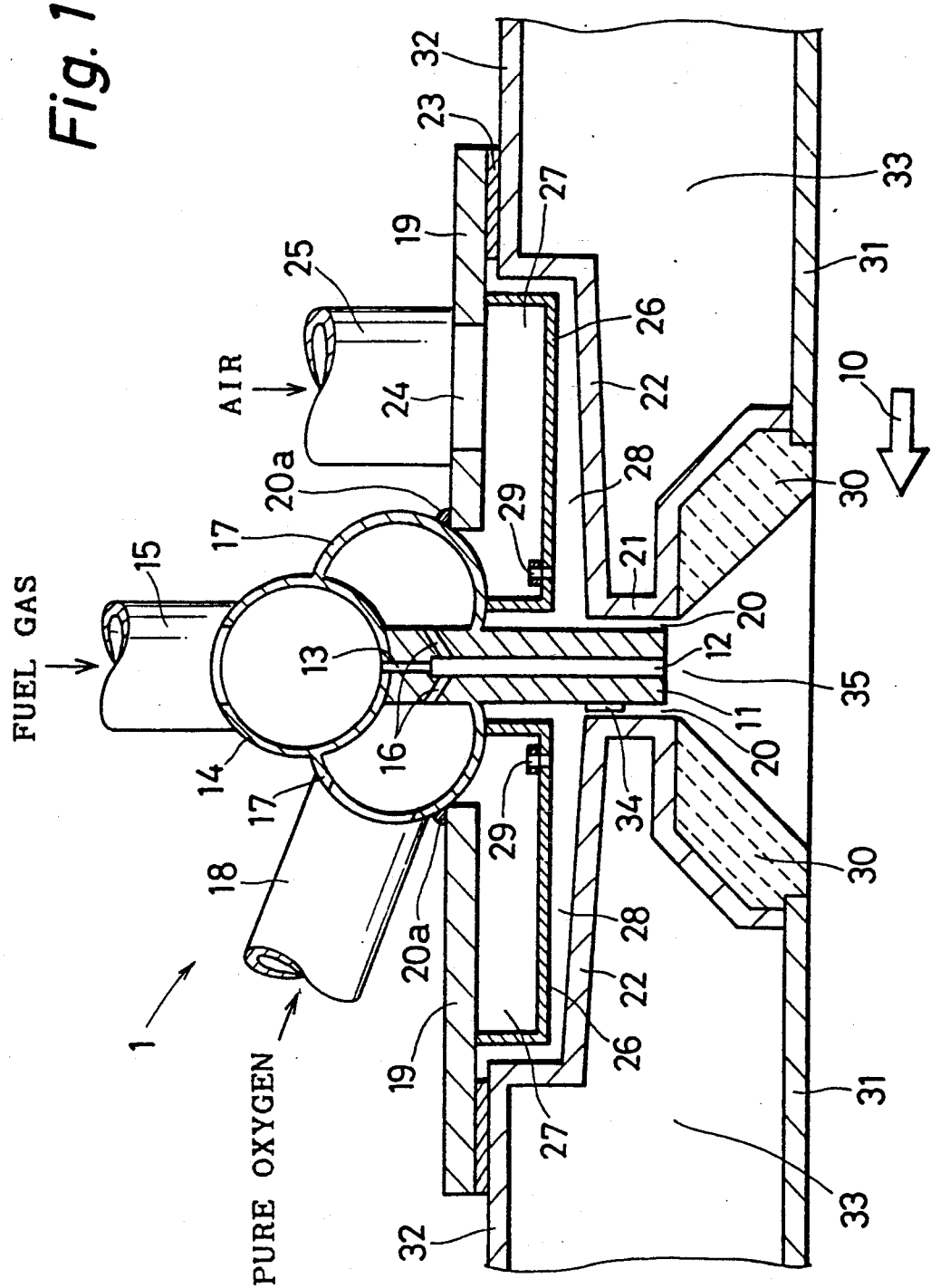
FIG. 1 is a sectional view of a soot generating burner 1 in an embodiment of the invention.

Now referring to the drawing, preferred embodiments of the invention are described below.

Figure 2:
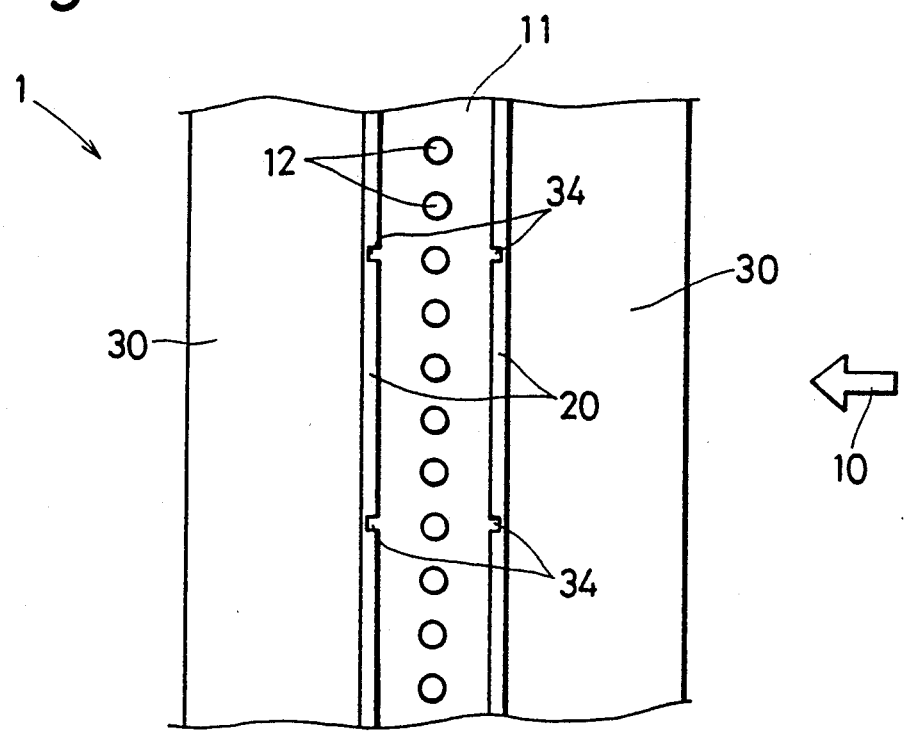
FIG. 2 is a bottom view of the soot generating burner.
Figure 3:
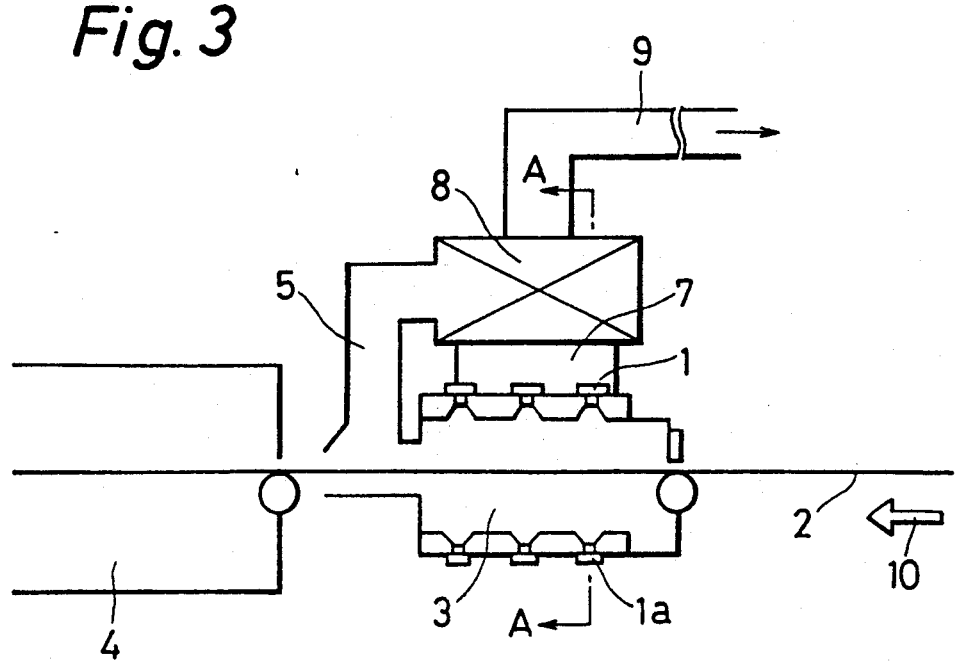
FIG. 3 is a systematic diagram showing a furnace 3 for depositing soot by using soot generating burners 1, 1a, and an annealing furnace 4.
Figure 4:
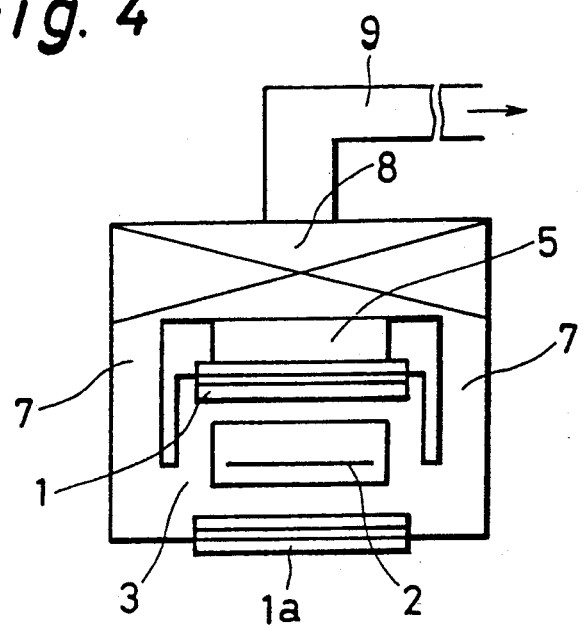
FIG. 4 is a sectional view of line A—A in FIG. 3.

FIG. 1 is a sectional view of a soot generating burner 1 in an embodiment of the invention, and FIG. 2 is a bottom view of the same soot generating burner 1. This soot generating burner 1 is, as shown in FIG. 3 and FIG. 4 in a sectional view of A—A in FIG. 3, designed to lead a cold rolled stainless steel strip 2 into a furnace 3 for depositing soot according to the invention, deposit soot on the surface of the stainless steel strip 2, deposit soot also on the lower surface by a similar burner 1a, and then anneal in an atmospheric annealing furnace 4. In this furnace 3 for depositing soot, usually, a plurality of soot generating burners 1, 1a are disposed above and beneath the furnace body, and their reducing flames contact, as if lapping, the upper and lower surfaces of the stainless steel strip 2 toward an exit duct 5 in the direction of an arrow 10. The reducing flame is formed by imperfect combustion of gas fuel at an air ratio of 0.2 to 0.6. The reducing flame burned and formed by the soot generating burners 1, 1a are gradually burned and oxidized while contacting the upper and lower surfaces of the stainless steel strip 2 to be finally combustion waste gas. Thus generated combustion waste gas is collected in a collector duct 8 mainly passing through the exit duct 5 and both side ducts 7 of the furnace 3, and is released to the atmosphere through suction fan or the like (not shown) installed before an exhaust duct 9, or is supplied again into the combustion furnace 4. By keeping a negative pressure within the furnace 3, air invades into the furnace 3 from outside, so that the combustion gas may be burnt almost completely until reaching the collector duct.

Figure 5:
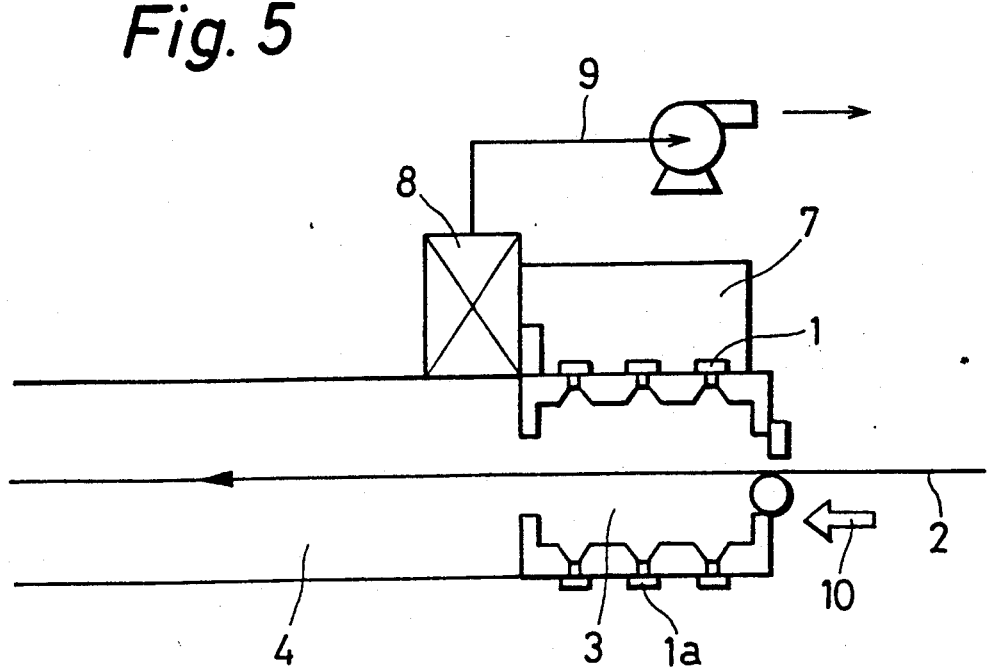
FIG. 5 is a systematic diagram showing the constitution of installing a furnace 3 at to the strip entrance side of an annealing furnace 4 in other embodiment of the invention.

In the embodiment shown in FIG. 3, it is composed to deposit soot on the surface of the stainless strip outside the annealing furnace 4 within the furnace 3, at the upstream side of the annealing surface 4, but in other embodiment of the invention, as shown in FIG. 5, it may be also designed to deposit soot on the surface of the stainless steel strip 2 at the entrance side of the steel strip 2 at the upstream side within the annealing furnace 4.

The soot generating burner 1 shown in FIG. 1 and FIG. 2 is most preferably installed in the upper part of the furnace body of the furnace 3 shown in FIG. 3 through FIG. 5 to be used to generate the flame downward. The stainless steel strip 2 is continuously passed in the direction indicated by the arrow 10.

A nozzle member 11 of the soot generating burner 1 stretches slenderly in a direction vertical to the passing direction 10 of the stainless steel strip 2, that is, in the widthwise direction of the stainless steel strip 2 to be passed (the vertical direction of the sheet of paper in FIG. 1, or vertical direction in FIG. 2), and this nozzle member 11 is provided with a multiplicity of nozzle openings 12 for injecting premixed gas at intervals in the same widthwise direction. In the upper part of the nozzle member 11, a communicating hole 13 to communicate with the nozzle openings 12 is formed, and a header 14 extending horizontally in the same direction as the widthwise direction is connected to this communicating hole 13. To the header 14, a fuel gas such as hydrocarbon gas and methane gas is supplied from outside the furnace 3 through a feed pipe 15. A communicating hole 16 is formed at the side of the nozzle member 11, and to this communicating hole 16, pure oxygen is supplied from a header 17. The supply flow rate of pure oxygen is less than the flow rate necessary for completely burning the combustion gas amount supplied into the nozzle openings 12 through the communicating hole 13 from the header 14.

A mounting member 19 of the soot generating burner 1 is welded to the header 17 as indicated by reference number 20a, and at both right and left sides in FIG. 1 of the nozzle member 11, plate members 21 for forming slender air injection ports 20 are disposed oppositely to the nozzle member 11. The plate members 21 form a part of an inner wall 31 of the furnace 3. An outer wall 32 of the inner wall 31 is fixed to the mounting member 19 of the soot generating burner 1 through a sealing material 23. To the mounting member 19 of the soot generating burner 1, a feed pipe 25 is connected through a communicating hole 24, and a guide air is supplied to this feed pipe 25. A partition member 26 is fixed from the header 17 to the mounting member 19 of the soot generating burner 1, thereby forming a first air chamber 27 communicating with the communicating hole 24, while a second air chamber 28 is formed by the partition member 26 and a housing 22 which is a part of the furnace partition member 26, thereby straightening the guide air supplied from the first air chamber 27 to the second air chamber 28. By forming the first air chamber 27 and second air chamber 28, and composing the throttling holes 29 for straightening the guide air, the guide air in the second air chamber 28 is stably injected from the air injection port 20 as straightened guide air. At the nozzle tip 35, burner tiles 30 are disposed in the plate member 21 at the inner wall 31 side. Cooling water is supplied in a space 33 enclosed by the inner wall 31, plate member 21, housing 22 and outer wall 32 to be cooled in water. As shown in FIGS. 1, 2, plural protrusions 34 are fixed at intervals in the nozzle member 11 in the widthwise direction, so that the air injection port 20 is prevented from being clogged or reduced in size even if thermal strain occurs between the nozzle member 11 and the plate member 21 of the housing 22.

This soot generating burner 1 injects the guide air from the slender slit air injection port 20 disposed along the nozzle member 11, and prevents the flame generated by burning a fuel gas mainly composed of hydrocarbon at a low air ratio from staying in the burner tip 35. That is, the flame formed by burning the fuel gas at low air ratio by the soot generating burner 1 contains a large amount of carbon produced by pyrolysis of hydrocarbon. The burner flame, being higher in temperature than the ambient temperature, is likely to be stagnant in the burner tip 35 due to buoyancy. When such flame having a high carbon content contacts with the substance cooled to low temperature such as the burner tiles 30 disposed in the outer region ahead of the nozzle tip 35, gas-phase carbon particles are solidified, and deposit on the inner surface of the burner tiles 30 ahead of the nozzle tip 35 in a form of soot. When such state continues for a long time, the soot further deposits and grows up to be in a form of icicle or lump, thereby stacking up near the burner tip 35. The present inventor discovered that such stagnant flame is the cause of soot deposit, and researched for the constitution for preventing such stagnation.

Initially, the soot generating burner 1 is intended to deposit soot on the stainless steel strip 2, and by raising the air ratio or elevating the ambient temperature, the combustion reaction of the fuel is promoted, so that the soot may not be efficiently deposited on the stainless steel strip 2. Or to decrease the stagnant flame, it was attempted to raise the fuel jet speed by increasing the charge of the fuel gas, or raise the jet speed by reducing the diameter of the burner nozzle openings 12. However, as the charge of the fuel gas is increased, the fuel basic cost rises, or when the diameter of nozzle openings 12 is reduced, the nozzle openings 12 are likely to be clogged with soot, and soot cannot be promptly deposited on the surface of stainless steel strip 2. Still more, the charge of the fuel gas is limited, hence these were not practical measures.

Accordingly, the present inventor discovered it is effective to present deposit of soot by preventing stagnation of flame by injecting guide air along the outer circumference of the nozzle openings 12. This guide air will lead the flame into the direction of the tip 35 of the burner 1 to prevent the flame from staying around the nozzle tip 35. As a result, deposit of soot in the burner nozzle tip 35 could be prevented. However, as the guide air was further increased, the combustion reaction was promoted by the oxygen in the supplied air, which was found to lead to a new problem of lowering of soot deposit rate on the steel strip. It is therefore preferable to maintain the charge of the guide air between 150 and 250% of the charge of the premixed gas.

It is intended to keep the secondary combustion air ratio of the fuel gas constant that the charge of the guide air is maintained about 150 to 250% depending on the charge of the premixed gas. By keeping constant the secondary combustion air ratio, the combustion reaction can be kept constant, and the soot generation efficiency may be set constant regardless of the fuel charge amount. If the fuel gas charge amount is small, the guide air volume is also small, but since the soot content in the flame is lower by the portion of decrease of fuel gas charge, the soot deposit is prevented.

In this way, the air ratio of the premixed gas injected from the nozzle openings 12 and the mixed gas with the guide air injected from the air injection port 20 (that is, the ratio of oxygen volume in the gas containing oxygen to be actually used to the theoretical oxygen volume necessary for completely burning the fuel gas) is, for example, 0.2 to 0.6.

The results of the experiment by the present inventor are explained herein. Test pieces of stainless steel were put still for 4 seconds immediately beneath the soot generating burner 1 shown in FIGS. 1, 2, and the results as shown in Table 1 were obtained. The fuel gas was butane. The charge ratio in Table 1 refers to the ratio of the premixed gas, that is, the sum V1 of the charges of butane and pure oxygen, to the guide air charge volume V2 from the air injection pot 20 (=V2/V1).

TABLE 1

| Butane charge (Nm³/h) | Premixed gas charge V1 (Nm³/h) | Guide air charge V2 (Nm³/h) | Charge ratio V2/V1 (%) | Evaluation |
|---|---|---|---|---|
| 3 | 9 | 16 | 178 | 3 |
| 5 | 15 | 36 | 240 | 4 |
| 6 | 18 | 43 | 239 | 5 |
| 8 | 21 | 50 | 238 | 5 |

The soot deposit state on test pieces was evaluated in five ranks, from rank 1 showing a sparing deposit on the surface to rank 5 showing a sufficient deposit over the entire surface of the test piece, and the deposit state was evaluated by dividing equally into five ranks. According to this experiment and other experiments, it is known that the charge of the guide air from the air injection port 20 is preferable in the charge ratio range of 150 to 250%, wherein the soot deposit amount for annealing of the stainless steel strip enhances the absorption efficiency of its heat.

Figure 6:
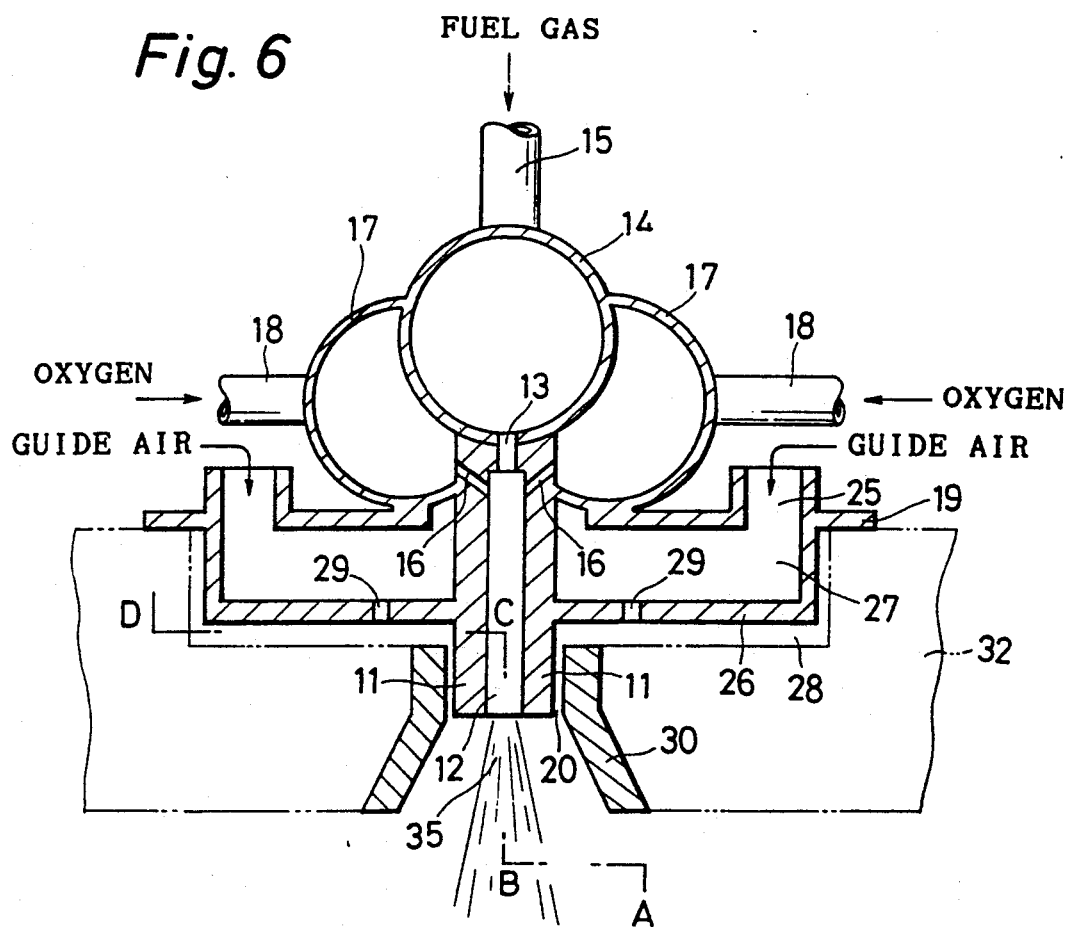
FIG. 6 is a sectional view of a soot generating burner in a different embodiment of the invention.
Figure 7:
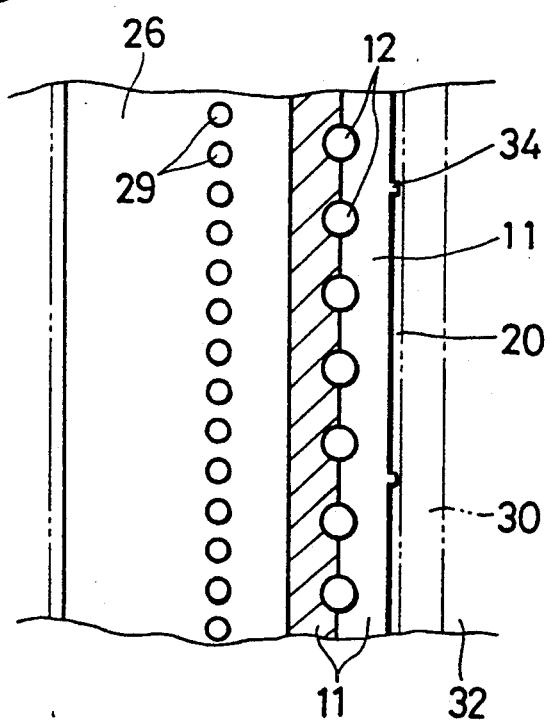
FIG. 7 is a sectional view as seen from cut section line A-B-C-D in FIG. 6.
Figure 8:
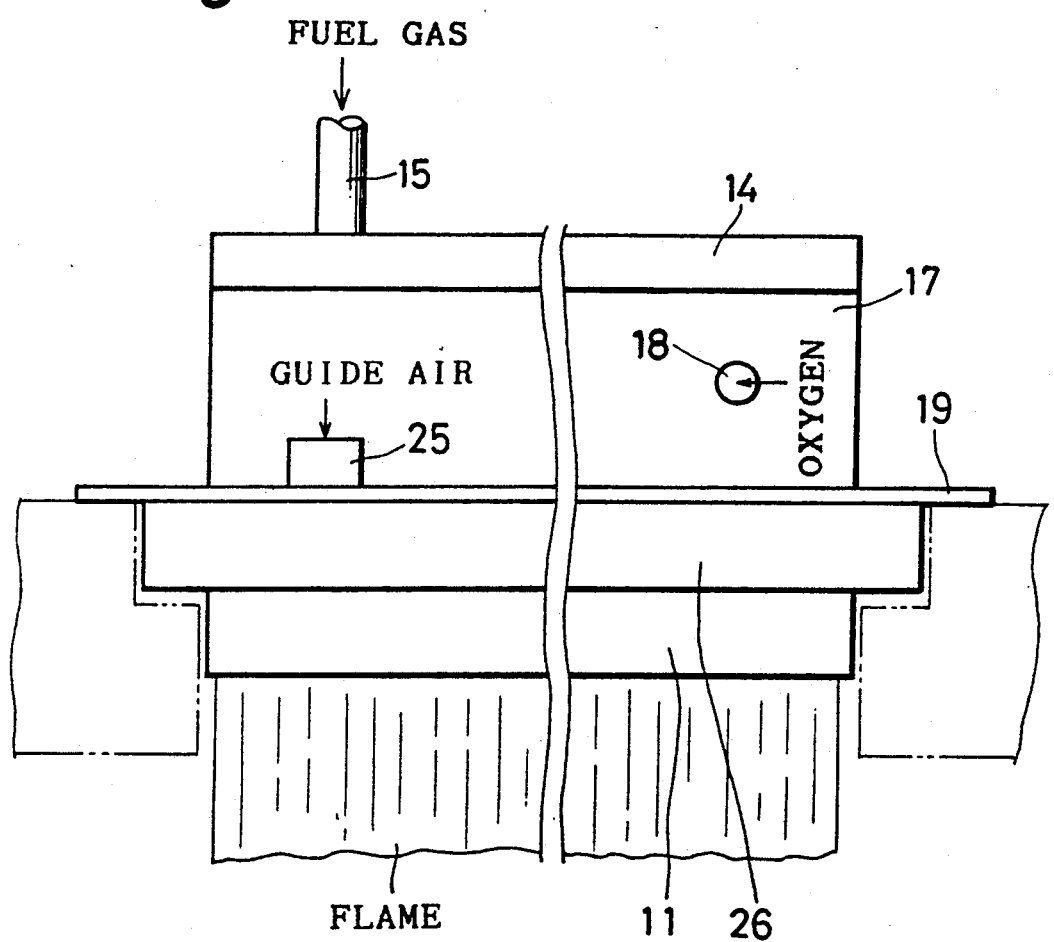
FIG. 8 is a sectional view of the embodiment shown in FIG. 6 and FIG. 7.

FIG. 6 is a sectional view of soot generating burner in other embodiment of the invention, FIG. 7 is a sectional view from cut section line A-B-C-D in FIG. 6, and FIG. 8 is a sectional view of the soot generating burner shown in FIG. 6 and FIG. 7. This embodiment is similar to the foregoing embodiment, and corresponding parts are identified with same reference numbers. In this embodiment, an injection port 20 of guide air is formed between the burner tiles 30 disposed on the furnace wall and the nozzle member 11. The furnace wall may be either cooled in water as in the foregoing embodiment, or made of refractories. The other constitution is same as in the preceding embodiment.

According to the invention, the soot generating burner may be used in a wide range for heating not only stainless steel strips but also other metal strips.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A burner for generating soot and comprising:

a nozzle member having a nozzle tip and at least one nozzle opening including an inlet end and an outlet end opening from said nozzle member at said nozzle tip;

means for supplying to said inlet end of said nozzle opening a gas mixture including a quantity of fuel gas to be partially combusted and a quantity of oxygen or oxygen enriched air sufficient for only partially combusting said quantity of fuel gas, and thereby for generating a flame issuing from said outlet end of said nozzle opening AND containing soot resultant from a noncombusted portion of said fuel gas; and means for guiding said flame issuing from said outlet end of said nozzle opening and for preventing said soot contained in said flame from depositing on said nozzle tip, said guiding and preventing means comprising an air injection port positioned adjacent said nozzle tip outwardly of said nozzle opening, and means for injecting through said air injection port a flow of air sufficient to guide said flame and said soot contained therein away from said nozzle tip.

2. A burner as claimed in claim 1, wherein said supplying means and said injecting means comprise means for ensuring that the amount of oxygen in said gas mixture and said flow of air is equal to from 0.2 to 0.6 of the amount of oxygen required to completely combust said quantity of fuel gas.

3. A burner as claimed in claim 1, wherein said injecting means comprises means for supplying said flow of air at a volume of 1.5 to 2.5 times the volume of said gas mixture.

4. A burner as claimed in claim 1, wherein said nozzle member is elongated in a widthwise direction thereof and includes a plurality of nozzle openings spaced in said widthwise direction.

5. A burner as claimed in claim 4, wherein said supplying means includes a fuel gas header extending in said widthwise direction and connected to said inlet end of each of said nozzle openings.

6. A burner as claimed in claim 5, wherein said supplying means further includes oxygen headers for the supply of oxygen or oxygen enriched air extending in said widthwise direction and located on respective opposite sides of said nozzle member, each said oxygen header being connected to said inlet end of each of said nozzle openings.

7. A burner as claimed in claim 4, wherein said guiding and preventing means comprises a respective said air injection port extending in said widthwise direction on each of respective opposite sides of said nozzle member.

8. A burner as claimed in claim 7, wherein said injecting means comprises, on each of said opposite sides of said nozzle member, a first chamber connected to an air supply, a second chamber connected to the respective said air injection port, and a plurality of throttling holes connecting said first and second chambers and spaced in said widthwise direction for supplying air from said first chamber to said second chamber and to said air injection port in a regulated lamellar flow.

9. A furnace for generating and depositing soot on a surface of a metal strip, said furnace having therein an interior space through which the metal strip is adapted to pass, and said furnace having at least one burner for generating soot and mounted to deposit such generated soot on the metal strip as it passes through said interior space, said burner comprising:

a nozzle member having a nozzle tip directed toward said interior space and at least one nozzle opening including an inlet end and an outlet end opening from said nozzle member at said nozzle tip;

means for supplying to said inlet end of said nozzle opening a gas mixture including a quantity of fuel gas to be partially combusted and a quantity of oxygen or oxygen enriched air sufficient for only partially combusting said quantity of fuel gas, and thereby for generating a flame issuing from said outlet end of said nozzle opening and containing soot resultant from a noncombusted portion of said fuel gas; and means for guiding said flame issuing from said outlet end of said nozzle opening to ensure projection of said flame into said interior space and for preventing said soot contained in said flame from depositing on said nozzle tip, said guiding and preventing means comprising an air injection port positioned adjacent said nozzle tip outwardly of said nozzle opening, and means for injecting through said air injection port a flow of air sufficient to guide said flame and said soot contained therein away from said nozzle tip and into said interior space.

10. A furnace as claimed in claim 9, comprising a plurality of said burners.

11. A furnace as claimed in claim 9, comprising first and second pluralities of said burners mounted to direct flames therefrom in opposite directions into said interior space.

12. A furnace as claimed in claim 11, wherein said first plurality of burners are mounted in a top of said furnace and direct respective flames thereof downwardly into said interior space, and said second plurality of burners are mounted in a bottom of said furnace and direct respective flames thereof upwardly into said interior space.

13. A furnace as claimed in claim 9, further comprising an annealing furnace for performing a heat treatment operation on the metal strip, said furnace being mounted at an upstream end of said annealing furnace, so that a metal strip having soot on a surface thereof may be supplied directly into said annealing furnace.

14. A furnace as claimed in claim 9, wherein said supplying means and said injecting means comprise means for ensuring that the amount of oxygen in said gas mixture and said flow of air is equal to from 0.2 to 0.6 of the amount of oxygen required to completely combust said quantity of fuel gas.

15. A furnace as claimed in claim 9, wherein said injecting means comprises means for supplying said flow of air at a volume of 1.5 to 2.5 times the volume of said gas mixture.

16. A furnace as claimed in claim 9, wherein said nozzle member is elongated in a widthwise direction of said furnace and includes a plurality of nozzle openings spaced in said widthwise direction.

17. A furnace as claimed in claim 16, wherein said supplying means includes a fuel gas header extending in said widthwise direction and connected to said inlet end of each of said nozzle openings.

18. A furnace as claimed in claim 17, wherein said supplying means further includes oxygen headers for the supply of oxygen or oxygen enriched air extending in said widthwise direction and located on respective opposite sides of said nozzle member, each said oxygen header being connected to said inlet end of each of said nozzle openings.

19. A furnace as claimed in claim 16, wherein said guiding and preventing means comprises a respective said air injection port extending in said widthwise direction on each of respective opposite sides of said nozzle member.

20. A furnace as claimed in claim 19, wherein said injecting means comprises, on each of said opposite sides of said nozzle member, a first chamber connected to an air supply, a second chamber connected to the respective said air injection port, and a plurality of throttling holes connecting said first and second chambers and spaced in said widthwise direction for supplying air from said first chamber to said second chamber and to said air injection port in a regulated lamellar flow.

* * * * *